United States Patent
Toyoda et al.

(10) Patent No.: US 6,841,643 B2
(45) Date of Patent: Jan. 11, 2005

(54) ADDITIVE FOR COMMUNICATION CABLE FILLER AND FILLER FOR COMMUNICATION CABLE

(75) Inventors: Hideo Toyoda, Sodegaura (JP); Kazunori Okawa, Yamaguchi (JP)

(73) Assignee: Mitsui Chemicals, Inc., Tokyo (JP)

(*) Notice: Subject to any disclaimer, the term of this patent is extended or adjusted under 35 U.S.C. 154(b) by 24 days.

(21) Appl. No.: 10/149,966

(22) PCT Filed: Oct. 18, 2001

(86) PCT No.: PCT/JP01/09150

§ 371 (c)(1),
(2), (4) Date: Jun. 18, 2002

(87) PCT Pub. No.: WO02/33710

PCT Pub. Date: Apr. 25, 2002

(65) Prior Publication Data

US 2003/0008957 A1 Jan. 9, 2003

(30) Foreign Application Priority Data

Oct. 18, 2000 (JP) ........................................ 2000-318339

(51) Int. Cl.$^7$ ............................................. C08F 210/16
(52) U.S. Cl. ................. 526/348; 526/348.2; 526/348.4; 526/348.5; 526/348.6; 526/351; 525/240
(58) Field of Search .............................. 526/348, 348.6, 526/348.2, 348.5; 525/240; 524/474

(56) References Cited

U.S. PATENT DOCUMENTS 6,127,441 A    10/2000  Sakamoto et al. ............. 521/91
6,335,410 B1 * 1/2002  Finalyson et al. ........... 526/348

FOREIGN PATENT DOCUMENTS

EP    416815 A    3/1991
JP    58-174429 A  10/1983

* cited by examiner

*Primary Examiner*—David W. Wu
*Assistant Examiner*—Rip A. Lee
(74) *Attorney, Agent, or Firm*—Birch, Stewart, Kolasch & Birch, LLP

(57) ABSTRACT

The additive (b) for a communication cable filler according to the present invention contains as a main component an ethylene/α-olefin copolymer (a) having a number-average molecular weight (Mn), measured by GPC, of 500 to 5,000 and having a crystallizing temperature (Tc (° C.), rate of temperature decrease: 2° C./min) measured by DSC and a density (D (kg/m$^3$)) measured by a density gradient tube method, said Tc and D satisfy the following formula (1):

$$0.501 \times D(\text{kg/m}^3) - 366 \geq Tc(° C.) \qquad (1).$$

The communication cable filler (c) according to the invention is prepared by blending (X) 40 to 90% by mass of polybutene (d) having a number-average molecular weight of 200 to 2,400, (Y) 1 to 50% by mass of an oil (e) and (Z) 1 to 15% by mass of the ethylene/α-olefin copolymer (a). The additive for a communication cable filler and the communication cable filler are excellent in the filling workability and the oil retention properties of a cable jelly.

19 Claims, No Drawings

ADDITIVE FOR COMMUNICATION CABLE FILLER AND FILLER FOR COMMUNICATION CABLE

This application is the national phase under 35 U.S.C. §371 of PCT International Application No. PCT/JP01/09150 which has an International filing date of Oct. 18, 2001, which designated the United States of America.

FIELD OF THE INVENTION

The present invention relates to an additive for a communication cable filler and a communication cable filler. More particularly, the invention relates to an additive for a communication cable filler, which comprises an ethylene/α-olefin copolymer having various excellent properties and available at a low cost, and to a communication cable filler having various excellent properties and available at a low cost, which is prepared by blending a given amount of the additive with polybutene and an oil.

BACKGROUND OF THE INVENTION

If armors or joints of communication cables, particularly those of communication cables for underground buried wiring are damaged or deteriorated, infiltration of water into the cables brings to impairment of electric transmission characteristics of the cables. Moreover, if a pinhole is present in the insulators of the cables, insulation is reduced by infiltration of water, and at last a short circuit takes place to sometimes bring about an accident of wire breaking.

To prevent circuit troubles due to infiltration of water into cables, development of waterproof communication cables has been made and a great number of communication cables filled with jelly-like filling materials came to be employed.

As the jelly-like filling materials, blends of petroleum jelly such as petrolatum, polybutene, atactic polypropylene (PP), mineral oil, various waxes and the like are generally employed, and they are publicly known. Especially for thick cables, there is no filling materials satisfying all the requirements such as waterproof properties, electrical properties, dropping properties, melting point, consistency and workability, and filling materials obtained by adding blends to petrolatum are mainly employed. From the viewpoints of cost and supply stability, however, formulations mainly using polybutene are advantageous. The "polybutene" referred to herein means polybutene in a narrow sense, namely, a liquid polymer of a pentamer to a pentacontamer obtained from a mixture of three isomers of n-1-butene, n-2-butene and isobutylene.

For the polybutene-based waterproof cable jellies, a great number of formulations have been proposed, and it is also known to use polyethylene (PE) wax, paraffin wax and microcrystalline wax as additives. The reason why polybutene is used is that the volume shrinkage after pouring of a jelly into the cable is minimized to impart flexibility to the cable, and an oil is added for the purpose of reducing cost and adjusting fluidity. The PE wax is used to harden the jelly by cooling and thereby prevent oozing of oil, and 1 to 20% of this wax is usually added.

In the filling work of a cable with a cable jelly having been melted at a high temperature, the temperature at which the molten cable jelly is cooled and hardened in the cable is desired to be as low as possible. The reason is that it is required to fill the cable with the cable jelly in low viscosity more rapidly and in every nook and corner. On this account, the crystallizing temperature (Tc) of the PE wax to determine the hardening temperature of the cable jelly is desired to be as low as possible.

On the other hand, the PE wax is also required to have oil retention properties to prevent oozing of the oil by hardening the oil and polybutene in the cable jelly. When Tc of the wax is decreased for the purpose of decreasing the hardening temperature of the cable jelly, there arises a problem that the oil retention properties are also reduced at the same time. The reason is that decrease of crystallinity or crystallizability of the wax to decrease the Tc results in lowering of oil retention properties.

It is an object of the present invention to provide an additive for a communication cable filler, which can satisfy both the filling workability and the oil retention properties of a cable jelly, and a communication cable filler containing the additive.

DISCLOSURE OF THE INVENTION

The present inventors have synthesized various PE waxes in order to solve the above problem and earnestly studied. As a result, they have found that the above problem can be solved by an additive (b) for a communication cable filler, which contains an ethylene/α-olefin copolymer (a) having a number-average molecular weight (Mn), measured by gel permeation chromatography (GPC), of 500 to 5,000 and having a crystallizing temperature (Tc (° C.), rate of temperature decrease: 2° C./min) measured by DSC and a density (D (kg/m$^3$)) measured by a density gradient tube method, said Tc and D satisfy a specific relation.

That is to say, the present invention is an additive (b) for a communication cable filler, which contains as a main component an ethylene/α-olefin copolymer (a) having a number-average molecular weight (Mn), measured by GPC, of 500 to 5,000 and having a crystallizing temperature (Tc (° C.), rate of temperature decrease: 2° C./min) measured by DSC and a density (D (kg/m$^3$)) measured by a density gradient tube method, said Tc and D satisfy the following formula (1):

$$0.501 \times D(\text{kg/m}^3) - 366 \geq Tc(°\text{ C.}) \quad (1),$$

preferably the following formula (2):

$$0.501 \times D(\text{kg/m}^3) - 367 \geq Tc(°\text{ C.}) \quad (2).$$

In the additive (b) for a communication cable filler according to the invention, the ethylene/α-olefin copolymer (a) is desirably an ethylene/α-olefin random copolymer obtained from ethylene and an α-olefin of 3 to 10 carbon atoms and having an ethylene component content of 90 to 99 mol % and an α-olefin component content of 10 to 1 mol %.

In the additive (b) for a communication cable filler according to the invention, the ethylene/α-olefin copolymer (a) is preferably one obtained by feeding ethylene, an α-olefin and hydrogen to the polymerization system in the presence of a metallocene catalyst containing as a main component a compound, having a cyclopentadienyl group, of a transition metal selected from the group consisting of titanium, zirconium, hafnium and vanadium to copolymerize ethylene with the α-olefin.

In the additive (b) for a communication cable filler according to the invention, a B value is calculated based on a chart of $^{13}$C-NMR (270 MHz) of the ethylene/α-olefin copolymer (a) and expressed by the following formula (3), $$B=P_{OE}/(2 \times P_O \cdot P_E) \quad (3)$$

wherein $P_E$ is a molar fraction of the ethylene component in the copolymer, $P_O$ is a molar fraction of the α-olefin component, and $P_{OE}$ is a molar fraction of α-olefin-ethylene sequences in the all dyad sequences, with the proviso that the molar fraction of each component is a value calculated except the terminal component, and the B value satisfies the following formula (4), $$1.0 < B < 2 \quad (4).$$

The present invention to solve the aforesaid problem is also a communication cable filler (c) containing as an essential component the above-mentioned additive (b) for a communication cable filler and comprising:

(X) 40 to 90% by mass of polybutene (d) having a number-average molecular weight of 200 to 2,400, (Y) 1 to 50% by mass of an oil (e), and (Z) 1 to 15% by mass of the ethylene/α-olefin copolymer (a).

The communication cable filler (c) according to the invention is preferably one having properties that in the oil drip test (REA PE-39 method, 80° C.×24 hr), any jelly and any oil do not fall from the funnel, and after standing for 24 hours, the total amount of the jelly and the oil adhering inside the leg of the funnel is not more than 20 mg.

PREFERRED EMBODIMENTS OF THE INVENTION

The present invention is described in detail hereinafter with reference to the following embodiments.

[Additive (b) for Communication Cable Filler]

The additive (b) for a communication cable filler according to the invention contains as a main component an ethylene/α-olefin copolymer (a) having a number-average molecular weight (Mn), measured by gel permeation chromatography (GPC), of 500 to 5,000 and having a crystallizing temperature (Tc (° C.), rate of temperature decrease: 2° C./min) measured by a differential scanning calorimeter (DSC) and a density (D (kg/m$^3$)) measured by a density gradient tube method, said Tc and D satisfy the following formula (1):

$$0.501 \times D(kg/m^3) - 366 \geq Tc(° C.) \quad (1),$$

preferably the following formula (2):

$$0.501 \times D(kg/m^3) - 367 \geq Tc(° C.) \quad (2).$$

The density (D) of the ethylene/α-olefin copolymer (a) in the formulas (1) and (2) relates, in this case, to a proportion of crystals (i.e., crystallinity (%)) and quality of crystals (i.e., crystallizability). If the type of the α-olefin is determined, the crystallinity depends upon the content of the α-olefin, and the crystallizability greatly depends upon the type of the α-olefin.

The density (D) in the formulas (1) and (2) is measured in accordance with ASTM-D-1505-68, and in the pretreatment, the sample is placed in a brass container, melted at 150° C. over a period of 1 hour in an electrical dryer and allowed to stand in a constant temperature bath at 23° C. for not shorter than 3 hours.

Although the α-olefin to constitute the ethylene/α-olefin copolymer (a) for use in the invention is not specifically restricted, it is preferably an α-olefin of 3 to 10 carbon atoms, for example, propene of 3 carbon atoms, 1-butene of 4 carbon atoms, 1-pentene of 5 carbon atoms, 1-hexene or 4-methyl-1-pentene of 6 carbon atoms, or 1-octene of 8 carbon atoms. Particularly preferable is propene, 1-butene, 1-hexene or 4-methyl-1-pentene.

The ethylene/α-olefin copolymer (a) for use in the invention is desirably an ethylene/α-olefin random copolymer obtained from ethylene and an α-olefin of 3 to 10 carbon atoms and having an ethylene component content of 90 to 99 mol % and an α-olefin component content of 10 to 1 mol %. The ethylene/α-olefin copolymer (a) has more desirably an ethylene component content of 90 to 95 mol % and an α-olefin component content of 10 to 5 mol %. When the α-olefin component content is in the above range, the crystallinity (i.e., proportion of crystal component) of the ethylene/α-olefin copolymer (a) does not become too low, so that when the copolymer (a) is used for a communication cable filler, the communication cable filler tends to be excellent in oil retention properties. When the α-olefin component content is in the above range, too much increase of the crystallizing temperature due to increase of the crystallinity does not take place, and workability in the production of a communication cable filler tends to be excellent.

The crystallizing temperature (Tc (° C.)) in the formulas (1) and (2) was measured in accordance with ASTM D 3417-75, and the rate of temperature decrease of DSC was decided to be 2° C./min in order to approximate the rate of temperature decrease to the actual hardening rate of the jelly.

There is no specific limitation on the process for preparing the ethylene/α-olefin copolymer (a) as far as such an ethylene/α-olefin copolymer (a) as mentioned above can be prepared. However, it is preferable to obtain the copolymer by feeding ethylene, an α-olefin and hydrogen to the polymerization system in the presence of a metallocene catalyst containing as a main component a compound having a cyclopentadienyl group, of a transition metal such as titanium, zirconium, hafnium and vanadium to copolymerize ethylene with the α-olefin.

As the metallocene catalyst, any of known catalysts employable for the preparation of polyethylene is available, but particularly preferable is a monocyclopentadienyl geometric constraint type metallocene catalyst for high-temperature polymerization because this catalyst is excellent in copolymerizability of ethylene and the α-olefin and is easily adaptable to the process suitable for copolymerization in the low-molecular weight region.

A co-catalyst employable in combination with the metallocene catalyst is, for example, an alkylaluminum compound or a boron compound, and the co-catalyst can be used when needed.

The ethylene/α-olefin copolymer (a) for use in the invention has a number-average molecular weight of 500 to 5,000, more preferably 500 to 3,000, as described above. When the number-average molecular weight is in the above range, the melting point of the communication cable filler does not become too low, and the consistency thereof does not become too large. When the number-average molecular weight is in the above range, further, the melting viscosity of the communication cable filler is moderate, and the workability tends to be excellent.

With respect to the ethylene/α-olefin copolymer (a) for use in the invention, a B value is calculated based on a chart of $^{13}$C-NMR (270 MHz) of the copolymer and expressed by the following formula (3), $$B = P_{OE}/(2 \times P_O \cdot P_E) \qquad (3)$$

wherein $P_E$ is a molar fraction of the ethylene component in the copolymer, $P_O$ is a molar fraction of the α-olefin component, and $P_{OE}$ is a molar fraction of α-olefin-ethylene alternating sequences in the all dyad sequences, with the proviso that the molar fraction of each component is a value calculated except the terminal component, and satisfies the following formula (4), $$1.0 < B < 2 \qquad (4).$$

With respect to the ethylene/α-olefin copolymer (a) for use in the invention, a B value is desired to satisfy preferably the following formula (4-a):

$$1.3 - 0.3 \times P_E \leq B < 1/P_E \qquad (4\text{-a}),$$

more preferably the following formula (4-b):

$$1.4 - 0.4 \times P_E \leq B < 1/P_E \qquad (4\text{-b}),$$

still more preferably the following formula (4-c):

$$1.5 - 0.5 \times P_E \leq B < 1/P_E \qquad (4\text{-c}).$$

The B value is an indicator of a distribution of the monomer components in the ethylene/α-olefin copolymer chains, and is calculated by determining the above-defined values of $P_E$, $P_O$ and $P_{OE}$ based on the reports by G. J. Ray (Macromolecules, 10, 773 (1977)), J. C. Randall (Macromolecules, 15, 353 (1982), J. Polymer Science, Polymer Physics Ed., 11, 275 (1973)) and K. Kimura (Polymer, 25, 441 (1984)).

The composition distribution B value is determined as follows. A $^{13}$C-NMR spectrum of a sample obtained by dissolving about 200 mg of the copolymer in 1 ml of hexachlorobutadiene in a sample tube of 10 mm in diameter is usually measured under the measuring conditions of a measuring temperature of 120° C., a measuring frequency of 25.0 MHz, a spectral width of 1500 Hz, a filter width of 1500 Hz, a pulse recurrence time of 4.2 sec, a pulse width of 7 μsec and integration numbers of 2000 to 5000, and from the spectrum, $P_E$, $P_O$ and $P_{OE}$ are determined, followed by calculation.

A larger B value indicates that the copolymer has fewer block-like chains, more homogeneous distribution of the ethylene units and the α-olefin units and narrower composition distribution. The B value calculated by the above formula becomes 2 when the both monomers are alternately distributed in the ethylene/α-olefin copolymer, while it becomes 0 in case of a complete-block copolymer wherein those monomers are completely separated from each other.

When an ethylene/α-olefin copolymer (a) having a B value in the above range is used, a communication cable filler (c) being excellent in oil drip properties can be obtained.

With respect to the ethylene/α-olefin copolymer (a) for use in the invention, further, any signals of αβ and βγ based on the methylene chain between adjacent two tertiary carbon atoms in the copolymer chain are not observed in the $^{13}$C-NMR spectrum.

For example, in a copolymer of ethylene and 4-methyl-1-pentene, central three methylene groups in the following bond are at the positions of α, β and γ from the left-hand side when seen from the left-hand tertiary carbon derived from 4-methyl-1-pentene, while they are at the positions of α, β and γ from the right-hand side when seen from the right-hand tertiary carbon.

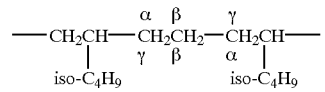

In the bond unit described above, therefore, methylene groups to give signals of αγ and ββ exist, but methylene groups to give signals of αβ and βγ do not exist.

Likewise, in the following bond wherein 4-methyl-1-pentene groups are head-to-tail bonded to each other, only a methylene group to give a signal of αu exists, but methylene groups to give signals of αβ and βγ do not exist.

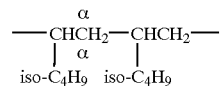

On the other hand, the following bonds have methylene groups to give a signal of βγ and methylene groups to give a signal of αβ, respectively.

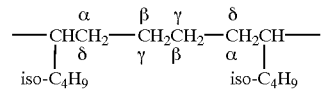

and

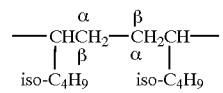

As is apparent from the above description, the ethylene/α-olefin copolymer (a) for use in the invention exhibits regular bond directions of the monomer copolymerized with ethylene.

The ethylene/α-olefin copolymer (a) can be used singly or in combination of plural kinds, as the additive (b) for a communication cable filler according to the invention.

The additive (b) for a communication cable filler according to the invention may further contain, as a gelatinizing agent, hydroxystearate, acrylic acid, methacrylic acid, a derivative or a polymer of acrylic acid and/or methacrylic acid, or a polyolefin elastomer (low-crystalline polymer or the like) containing ethylene, propylene or butene as a main component, in addition to the ethylene/α-olefin copolymer (a).

The gelatinizing agent can be added in an amount of usually 0.1 to 50 parts by mass, preferably 0.5 to 30 parts by mass, more preferably 1 to 10 parts by mass, based on 100 parts by mass of the ethylene/α-olefin copolymer (a).

In addition, publicly known additives, such as antioxidant, flame retardant and weathering stabilizer, can be added when needed.

The above-mentioned additives, such as gelatinizing agent, antioxidant, flame retardant and weathering stabilizer, can be added in an arbitrary way, and methods or techniques publicly known are applicable.

[Communication Cable Filler (c)]

The communication cable filler (c) (sometimes referred to as "cable jelly" hereinafter) according to the invention comprises polybutene (d), an oil (e) and the additive (b) for a communication cable filler, which contains the ethylene/α-olefin copolymer (a) having the aforesaid specific properties.

In the communication cable filler (c) according to the invention, the ethylene/α-olefin copolymer (a) is added in such an amount that the content of the copolymer becomes usually 1 to 20% by mass, preferably 1 to 15% by mass, more preferably 5 to 10% by mass, based on the total amount of the cable jelly.

When the amount of the ethylene/α-olefin copolymer (a) added is in the above range, the hardening temperature of the cable jelly can be sufficiently lowered, and after hardening, the cable jelly does not become brittle and tends to hardly suffer cracks such as crazes.

As the polybutene (d) that is a main component of the communication cable filler (c) of the invention, polybutene having a number-average molecular weight of 200 to 2,400, preferably 500 to 1,500, is used, and a commercially available one is employable. Hydrogenated polybutene obtained by hydrogenation of polybutene with nickel or the like by a known method is also employable.

When the number-average molecular weight of the polybutene (d) is in the above range, excessive softening of the cable jelly due to large consistency does not occur. Moreover, the cable jelly has a moderate melt viscosity and tends to be excellent in workability. If the polybutene (d) is not used, the cable jelly becomes too hard and exhibits insufficient electrical properties and waterproof properties, so that such a case is unfavorable.

In the communication cable filler (c) according to the invention, the polybutene (d) is used in an amount of usually 40 to 90% by mass, preferably 40 to 80% by mass, more preferably 50 to 70% by mass, based on the total amount of the cable jelly.

When the amount of the used polybutene (d) is in the above range, the cable jelly does not become too soft and has a moderate viscosity in the melting process. Moreover, the filling workability tends to be excellent.

The oil (e) added for the communication cable filler (c) of the invention may be a synthetic oil or a natural oil, and examples such oils include mineral oil, fuel oil, industrial stock oil, waste oil and edible oil. More specific examples include liquid hydrocarbons, such as kerosine, gas oil, crude oil, heavy oil, lubricating oil and liquid paraffin; fluid non-crystalline polymers, such as polybutene oligomer; and animal and vegetable oils used as edible oils, such as olive oil.

In the communication cable filler (c) according to the invention, the oil (e) is added in an amount of usually 1 to 50% by mass, preferably 10 to 50% by mass, more preferably 20 to 40% by mass, based on the total amount of the cable jelly.

When the amount of the added oil (e) is in the above range, the cable jelly has a moderate viscosity and tends to be sufficiently hardened to give a appropriate jelly.

The total amount of the ethylene/α-olefin copolymer (a), the polybutene (d) and the oil (e) usually becomes 100% by mass. However, if other arbitrary components are contained in the communication cable filler (c), the total amount thereof becomes less than 100% by mass.

The oil (e) for use in the invention is desirably added in an amount of preferably 10 to 100 parts by mass, more preferably 40 to 60 parts by mass, based on 100 parts by mass of the polybutene.

Although the communication cable filler (c) of the invention contains the polybutene (d), the oil (e) and the ethylene/α-olefin copolymer (a) as essential components, other components publicly known in the field of cable jelly, such as atactic polypropylene, styrene elastomer and polyolefin elastomer, can be added when needed, so far as the properties of the communication cable filler (c) of the invention are not impaired. These arbitrary components are added in amounts of about 0.1 to 80% by mass, preferably about 10 to 20% by mass, based on the total amount of the cable jelly.

The communication cable filler (c) of the invention preferably has properties that, in the later-described oil drip test (REA PE-39 method, 80°C.×24 hr), any jelly and any oil do not fall from the funnel, and after standing for 24 hours, the total amount of the jelly and the oil adhering inside the leg of the funnel is not more than 20 mg, preferably not more than 5 mg.

Whether the jelly has fallen to a position lower than the conical part of the funnel is judged by visual observation, and the total amount of the jelly and the oil adhering inside the leg of the funnel is measured in the following manner. The jelly adhering inside the leg is scraped from the bottom of the funnel by a small spatula and is weighed.

The communication cable filler (c) satisfying the above conditions in the oil drip test has excellent ability to prevent infiltration of water into the communication cable when the outermost layer of the cable is broken.

EFFECT OF THE INVENTION

According to the invention, an additive for a communication cable filler, which can satisfy both properties of filling workability and oil retention properties of a cable jelly, and a communication cable filler composition can be provided, as described above.

EXAMPLES

The present invention is further described with reference to the following examples.

[Preparation Example 1]

<Preparation of Ethylene/α-olefin Copolymer>

An ethylene/α-olefin copolymer was prepared in the following manner using a metallocene catalyst.

In a 2-liter stainless steel autoclave thoroughly purged with nitrogen, 950 ml of hexane and 50 ml of propene were placed, and hydrogen was fed until the pressure in the system was reached 1.0 kg/cm² (gauge pressure). The temperature in the system was raised to 150° C., and then 0.3 mmol of triisobutylaluminum, 0.004 mmol of triphenylcarbeniumtetrakis(pentafluorophenyl)borate and 0.02 mmol of (t-butylamido)dimethyl(tetramethyl-$\eta^5$-cyclopentadienyl)silane titanium dichloride (available from Sigma-Aldrich Co.) were forced into the autoclave with ethylene to initiate polymerization. Thereafter, only ethylene was continuously fed to maintain the total pressure at 30 kg/cm² (gauge pressure), and polymerization was conducted at 150° C. for 20 minutes.

After a small amount of ethanol was added to the system to terminate the polymerization, the unreacted ethylene and propene in the system was purged off. The obtained polymer solution was dried overnight at 100° C. under reduced pressure. As a result, 32.5 g of an ethylene/propene copolymer (WAX 1) having Mn of 2,050, a propene content of 7.3 mol %, a density of 920 kg/M³, a crystallizing temperature of 93° C. and a B value of 1.051 as shown in Table 1 was obtained.

[Preparation Example 2]

<Preparation of Ethylene/α-olefin Copolymer>

Polymerization was carried out in the same manner as in Preparation Example 1, except that 935 ml of hexane and 65 ml of 1-butene as an α-olefin component were placed and hydrogen was fed until the pressure in the system was reached 1.5 kg/cm² (gauge pressure). As a result, 37.5 g of an ethylene/1-butene copolymer (WAX 2) having Mn of 1,900, a 1-butene content of 5.6 mol %, a density of 920 kg/m³, a crystallizing temperature of 93° C. and a B value of 1.038 as shown in Table 1 was obtained.

[Preparation Example 3]

<Preparation of Ethylene/α-olefin Copolymer>

Polymerization was carried out in the same manner as in Preparation Example 1, except that 920 ml of hexane and 80 ml of 1-hexene as an α-olefin component were placed and hydrogen was fed until the pressure in the system was reached 2.0 kg/cm² (gauge pressure). As a result, 43.2 g of an ethylene/1-hexene copolymer (WAX 3) having Mn of 2,100, a 1-hexene content of 3.4 mol %, a density of 917 kg/m³, a crystallizing temperature of 93° C. and a B value of 1.025 as shown in Table 1 was obtained.

[Preparation Example 4]

<Preparation of Ethylene/α-olefin Copolymer>

Polymerization was carried out in the same manner as in Preparation Example 1, except that 910 ml of hexane and 90 ml of 4-methyl-1-pentene as an α-olefin component were placed and hydrogen was fed until the pressure in the system was reached 2.0 kg/cm² (gauge pressure). As a result, 41.2 g of an ethylene/4-methyl-1-pentene copolymer (WAX 4) having Mn of 2,000, a 4-methyl-1-pentene content of 3.7 mol %, a density of 918 kg/m³, a crystallizing temperature of 93° C. and a B value of 1.027 as shown in Table 1 was obtained.

[Preparation Example 5]

<Preparation of Ethylene/α-olefin Copolymer>

Polymerization was carried out in the same manner as in Preparation Example 1, except that 935 ml of hexane and 65 ml of 1-butene as an α-olefin component were placed and hydrogen was fed until the pressure in the system was reached 3.5 kg/cm² (gauge pressure). As a result, 31.2 g of an ethylene/1-butene copolymer (WAX 5) having Mn of 600, a 1-butene content of 5.2 mol %, a density of 920 kg/m³, a crystallizing temperature of 92° C. and a B value of 1.040 as shown in Table 1 was obtained.

[Preparation Example 6]

<Preparation of Ethylene/α-olefin Copolymer>

Polymerization was carried out in the same manner as in Preparation Example 1, except that 935 ml of hexane and 65 ml of 1-butene as an α-olefin component were placed and hydrogen was fed until the pressure in the system was reached 1.0 kg/cm² (gauge pressure). As a result, 38.8 g of an ethylene/1-butene copolymer (WAX 6) having Mn of 4,000, a 1-butene content of 5.7 mol %, a density of 920 kg/m³, a crystallizing temperature of 92° C. and a B value of 1.037 as shown in Table 1 was obtained.

[Preparation Example 7]

<Preparation of Ethylene/α-olefin Copolymer>

Polymerization was carried out in the same manner as in Preparation Example 1, except that 935 ml of hexane and 60 ml of 1-butene as an α-olefin component were placed and hydrogen was fed until the pressure in the system was reached 1.0 kg/cm² (gauge pressure). As a result, an ethylene/1-butene copolymer (WAX 7) having Mn of 2,200, a 1-butene content of 3.5 mol %, a density of 930 kg/m³, a crystallizing temperature of 98° C. and a B value of 1.027 as shown in Table 1 was obtained.

[Preparation Example 8]

<Preparation of Ethylene/α-olefin Copolymer>

Polymerization was carried out in the same manner as in Preparation Example 1, except that 935 ml of hexane and 63 ml of 1-butene as an α-olefin component were placed and hydrogen was fed until the pressure in the system was reached 1.0 kg/cm² (gauge pressure). As a result, an ethylene/1-butene copolymer (WAX 8) having Mn of 1,900, a 1-butene content of 5.0 mol %, a density of 925 kg/m³, a crystallizing temperature of 96° C. and a B value of 1.035 as shown in Table 1 was obtained.

[Comparative Preparation Example 1]

<Preparation of Catalyst>

In a 1.5-liter glass autoclave, 25 g of commercially available anhydrous magnesium chloride was suspended in 500 ml of hexane. The suspension was maintained at 30° C., and with stirring, 92 ml of ethanol was dropwise added over a period of 1 hour, followed by reaction for 1 hour. After the completion of the reaction, 93 ml of diethylaluminum monochloride was dropwise added over a period of 1 hour, followed by reaction for 1 hour. After the completion of the reaction, 90 ml of titanium tetrachloride was dropwise added, and the temperature of the autoclave was raised to 80° C., followed by reaction for 1 hour.

After the completion of the reaction, the solids were washed with hexane by decantation until no titanium liberated was detected. The obtained solids were suspended in hexane to give a hexane suspension, and the titanium concentration of the hexane suspension was quantitatively determined by titration. This hexane suspension was used for the following experiment.

<Preparation of Ethylene/α-olefin Copolymer>

In a 2-liter stainless steel autoclave thoroughly purged with nitrogen, 930 ml of hexane and 70 ml of 1-butene were placed, and hydrogen was fed until the pressure in the system was reached 20.0 kg/cm² (gauge pressure). The temperature in the system was raised to 170° C., and 0.1 mmol of triethylaluminum, 0.4 mmol of ethylaluminumsesquichloride and 0.008 mmol in terms of titanium atom of the titanium component obtained above were forced into the autoclave with ethylene to initiate polymerization. Thereafter, only ethylene was continuously fed to maintain the total pressure at 40 kg/cm² (gauge pressure), and polymerization was conducted at 170° C. for 40 minutes.

After a small amount of ethanol was added to the system to terminate the polymerization, the unreacted ethylene and 1-butene in the system was purged off. The obtained polymer solution was dried overnight at 100° C. under reduced pressure. As a result, 129 g of an ethylene/1-butene copolymer (WAX 9) having Mn of 2,000, a 1-butene content of 5.4 mol %, a density of 917 kg/m³, a crystallizing temperature of 101° C. and a B value of 1.023 as shown in Table 1 was obtained.

[Comparative Preparation Example 2]

<Preparation of Ethylene/α-olefin Copolymer>

Polymerization was carried out in the same manner as in Comparative Preparation Example 1, except that 850 ml of hexane and 150 ml of 4-methyl-1-pentene as an α-olefin component were placed and hydrogen was fed until the pressure in the system was reached 21.0 kg/cm² (gauge pressure). As a result, 99 g of an ethylene/4-methyl-1-pentene copolymer (WAX 10) having Mn of 2,100, a 4-methyl-1-pentene content of 3.7 mol %, a density of 919 kg/m³, a crystallizing temperature of 105° C. and a B value of 1.015 as shown in Table 1 was obtained.

[Comparative Preparation Example 3]

<Preparation of Ethylene/α-olefin Copolymer>

Polymerization was carried out in the same manner as in Preparation Example 1, except that no α-olefin component was placed, 1,000 ml of hexane was placed, and hydrogen was fed until the pressure in the system was reached 2.5 kg/cm² (gauge pressure). As a result, 34.4 g of an ethylene polymer (WAX 11) having Mn of 2,000, a density of 977 kg/m³ and a crystallizing temperature of 126° C. as shown in Table 1 was obtained.

[Comparative Preparation Example 4]

<Preparation of Ethylene/α-olefin Copolymer>

Polymerization was carried out in the same manner as in Preparation Example 1, except that 920 ml of hexane and 80 ml of propane were placed. As a result, 29.9 g of an ethylene/propene copolymer (WAX 12) having Mn of 1,800, a propene content of 11.2% by mol, a density of 897 kg/m³, a crystallizing temperature of 81° C. and a value of 1.040 as shown in Table 1 was obtained.

TABLE 1

(List of basic properties of ethylene/α-olefin copolymer (a) )

| Name of ethylene/α-olefin copolymer | Type of α-olefin | α-Olefin content (mol %) | Number-average molecular weight (Mn) | Density (D) (kg/m³) | Left-hand member of the formula (1) | Crystallization temperature (Tc) (° C.) | B value | Preparation Example |
|---|---|---|---|---|---|---|---|---|
| WAX1 | propene | 7.3 | 2050 | 920 | 94.9 | 93 | 1.051 | Prep. Ex. 1 |
| WAX2 | 1-butene | 5.6 | 1900 | 920 | 94.9 | 93 | 1.038 | Prep. Ex. 2 |
| WAX3 | 1-hexene | 3.4 | 2100 | 917 | 93.5 | 93 | 1.025 | Prep. Ex. 3 |
| WAX4 | 4-methyl-1-pente | 3.7 | 2000 | 918 | 93.9 | 93 | 1.027 | Prep. Ex. 4 |
| WAX5 | 1-butene | 5.2 | 600 | 920 | 94.9 | 92 | 1.040 | Prep. Ex. 5 |
| WAX6 | 1-butene | 5.7 | 4000 | 920 | 94.9 | 92 | 1.037 | Prep. Ex. 6 |
| WAX7 | 1-butene | 3.5 | 2200 | 930 | 99.9 | 98 | 1.027 | Prep. Ex. 7 |
| WAX8 | 1-butene | 5.0 | 1900 | 925 | 97.4 | 96 | 1.035 | Prep. Ex. 8 |
| WAX9 | 1-butene | 5.4 | 2000 | 917 | 93.5 | 101 | 1.023 | Comp. Prep. Ex. 1 |
| WAX10 | 4-methyl-1-pente | 3.7 | 2100 | 919 | 94.4 | 105 | 1.015 | Comp. Prep. Ex. 2 |
| WAX11 | none | 0 | 2000 | 977 | 124.9 | 126 | — | Comp. Prep. Ex. 3 |
| WAX12 | propene | 11.2 | 1800 | 897 | 83.4 | 81 | 1.040 | Comp. Prep. Ex. 4 |

Examples 1–8, Comparative Examples 1–4

Using the ethylene/α-olefin copolymers (ethylene polymer in case of Comparative Example 3) obtained in Preparation Examples and Comparative Preparation Examples mentioned above, cable jellies were prepared in the following manner, and the properties of the cable jellies were evaluated. The results are shown in Table 2.

In Examples and Comparative Examples, oil drip properties and bodying temperatures of the cable jellies were evaluated by the following methods.

<Preparation of Cable Jelly>

The total amount of 30 g of a sample consisting of the components shown in Table 2 was weighed and placed into a 100-ml glass beaker and sufficiently blended at about 130° C. by an oil bath. (For stirring, small-sized three turbine blades were used. number of revolutions: 100 revolutions/min, stirring time: 30 minutes)

<Evaluation of Oil Drip Properties>

A glass funnel (diameter of conical part: 55 cm, length of leg: 1 cm) stopped by inserting a glass bar into the leg was maintained at 130° C. for not shorter than 30 minutes in an oven. Then, the cable jelly prepared as above was poured into the conical part of the glass funnel with maintaining the funnel at 130° C. The glass funnel was slowly cooled to room temperature over a period of about 12 hours, then the glass bar was slowly drawn out from the leg, and the glass funnel was allowed to stand still for 24 hours in a circulating oven at 80° C. Then, the whole amount of the oil having fallen from the leg of the funnel onto a beaker used as a receiver was measured.

<Measurement of Bodying Temperature>

Temperatures at which a melt viscosity, isothermally measured by a Brookfield viscometer, of the cable jelly prepared as above exhibits a constant value (no increase by not less than 2%) for 30 minutes are measured, and the lowest temperature among them is taken as a bodying temperature.

TABLE 2

(Evaluation of cable jelly properties)

| | Composition of cable jelly (weight %) | | | | Evaluation of properties | |
|---|---|---|---|---|---|---|
| | Polybutene (d) | Oil (e) | Ethylene/α-olefin copolymer (a) | | Oil drip properties (mg/amount-jelly) | Bodying temperature (° C.) |
| Aimed value | | | | | not more than 100 | not higher than 102 |
| Ex. 1 | 55 | 37 | WAX1 | 8 | 80 | 97 |
| Ex. 2 | 55 | 37 | WAX2 | 8 | 10 | 97 |
| Ex. 3 | 55 | 37 | WAX3 | 8 | 80 | 97 |
| Ex. 4 | 55 | 37 | WAX4 | 8 | 90 | 97 |
| Ex. 5 | 55 | 37 | WAX5 | 8 | 90 | 98 |
| Ex. 6 | 55 | 37 | WAX6 | 8 | 20 | 96 |
| Ex. 7 | 55 | 37 | WAX7 | 8 | 1 | 102 |
| Ex. 8 | 55 | 37 | WAX8 | 8 | 5 | 100 |
| Comp. Ex. 1 | 55 | 37 | WAX9 | 8 | 1700 | 105 |
| Comp. Ex. 2 | 55 | 37 | WAX10 | 8 | 1900 | 109 |
| Comp. Ex. 3 | 55 | 37 | WAX11 | 8 | 40 | 129 |
| Comp. Ex. 4 | 55 | 37 | WAX12 | 8 | not less than 3000 | 82 |

What is claimed is:

1. An additive (b) for a communication cable filler, containing an ethylene/α-olefin copolymer (a) having a number-average molecular weight (Mn), measured by gel permeation chromatography (GPC), of 500 to 5,000 and having a crystallizing temperature (Tc (° C.), rate of temperature decrease: 2° C./min) measured by a differential scanning calorimeter (DSC) and a density (D (kg/m³)) measured by a density gradient tube method, said Tc and D satisfying the following formula (1):

$$0.501 \times D(\text{kg/m}^3) - 366 \geq Tc(°\text{C.}) \quad (1),$$

wherein the α-olefin is at least one selected from the group consisting of propene, 1-butene, 1-hexene and 4-methyl-1-pentene.

2. The additive (b) for a communication cable filler as claimed in claim 1, wherein the ethylene/α-olefin copolymer (a) has a crystallizing temperature (Tc (° C.), rate of temperature decrease: 2° C./min) measured by a differential scanning calorimeter (DSC) and a density (D (kg/m³) measured by a density gradient tube method, said Tc and D satisfying the following formula (2):

$$0.501 \times D(\text{kg/m}^3) - 367 \geq Tc(°\text{C.}) \quad (2).$$

3. The additive (b) for a communication cable filler as claimed in claim 1, wherein the ethylene/α-olefin copolynier (a) is an ethylene/α-olefin random copolymer having an ethylene component content of 90 to 99 mol % and an α-olefin component content of 10 to 1 mol %.

4. The additive (b) for a communication cable filler as claimed in claim 1, wherein the ethylene/α-olefin copolymer (a) is obtained by feeding ethylene, an α-olefin and hydrogen to the polymerization system in the presence of a metallocene catalyst containing a compound having a cyclopentadienyl group and a transition metal selected from the group consisting of titanium, zirconium, hafnium and vanadium to copolymerize ethylene with the α-olefin.

5. The additive (b) for a communication cable filler as claimed in claim 1, wherein the ethylene/α-olefin copolymer (a) satisfies the following formula (3), $$B = P_{OE}/(2 \times P_O \cdot P_E) \quad (3)$$

wherein $P_E$ is a molar fraction of the ethylene component in the copolymer, $P_O$ is a molar fraction of the α-olefin component, and $P_{OE}$ is a molar fraction of α-olefin-ethylene sequences in the all dyad sequences, with the proviso that the molar fraction of each component is a value calculated except the terminal component, and the B value is calculated based on a chart of $^{13}$C-NMR (270 MHz) and satisfies the following formula (4), $$1.0 < B < 2 \quad (4).$$

6. The additive (b) for a communication cable filler as claimed in claim 1, wherein the α-olefin is at least one selected from the group consisting of propene, 1-hexene and 4-methyl-1-pentene.

7. The additive (b) for a communication cable filler as claimed in claim 2, wherein the ethylene/α-olefin copolymer (a) is an ethylene/α-olefin random copolymer having an ethylene component content of 90 to 99 mol % and an α-olefin component content of 10 to 1 mol %.

8. The additive (b) for a communication cable filler as claimed in claim 2, wherein the ethylene/α-olefin copolymer (a) is obtained by feeding ethylene, an α-olefin and hydrogen to the polymerization system in the presence of a metallocene catalyst containing a compound having a cyclopentadienyl group and a transition metal selected from the group consisting of titanium, zirconium, hafnium and vanadium to copolymerize ethylene with the α-olefin.

9. The additive (b) for a communication cable filler as claimed in claim 2, wherein the ethylene/α-olefin copolymer (a) satisfies the following formula (3), $$B = P_{OE}/(2 \times P_O \cdot P_E) \quad (3)$$

wherein $P_E$ is a molar fraction of the ethylene component in the copolymer, $P_O$ is a molar fraction of the α-olefin component, and $P_{OE}$ is a molar fraction of α-olefin-ethylene sequences in the all dyad sequences, with the proviso that the molar fraction of each component is a value calculated except the terminal component, and the B value is calculated based on a chart of $^{13}$C-NMR (270 MHz) and satisfies the following formula (4), $$1.0 < B < 2 \tag{4}$$

10. A communication cable filler (c) containing as an essential component the additive (b) for a communication cable filler of claim 1 or 2 and comprising:

(X) 40 to 90% by mass of polybutene (d) having a number-average molecular weight of 200 to 2,400, (Y) 1 to 50% by mass of an oil (e), and (Z) 1 to 15% by mass of the ethylene/α-olefin copolymer (a) of claim 1 or 2.

11. The communication cable filler (c) as claimed in claim 10, having properties that in the oil drip test (REA PE-39 method, 80° C.×24 hr), any jelly and any oil do not fall from the funnel, and after standing for 24 hours, the total amount of the jelly and the oil adhering inside the leg of the funnel is not more than 20 mg.

12. An additive (b) for a communication cable filler, containing an ethylene/α-olefin copolymer (a) having a number-average molecular weight (Mn), measured by gel permeation chromatography (GPC), of 500 to 3,000 and having a crystallizing temperature (Tc (° C.), rate of temperature decrease: 2° C./min) measured by a differential scanning calorimeter (DSC) and a density (D (kg/m$^3$)) measured by a density gradient tube method, said Tc and D satisfying the following formula (1):

$$0.501 \times D(\text{kg/m}^3) - 366 \geq Tc(° \text{C.}) \tag{1}$$

13. The additive (b) for a communication cable filler as claimed in claim 12, wherein the ethylene/α-olefin copolymer (a) has a crystallizing temperature (Tc (° C.), rate of temperature decrease: 2° C./min) measured by a differential scanning calorimeter (DSC) and a density (D (kg/m$^3$) measured by a density gradient tube method, said Tc and D satisfying the following formula (2):

$$0.501 \times D(\text{kg/m}^3) - 367 \geq Tc(° \text{C.}) \tag{2}$$

14. The additive (b) for a communication cable filler as claimed in claim 12, wherein the ethylene/α-olefin copolymer (a) is an ethylene/α-olefin random copolymer obtained from ethylene and an α-olefin of 3 to 10 carbon atoms and having an ethylene component content of 90 to 99 mol % and an α-olefin component content of 10 to 1 mol %.

15. The additive (b) for a communication cable filler as claimed in claim 12, wherein the ethylene/α-olefin copolymer (a) is obtained by feeding ethylene, an α-olefin and hydrogen to the polymerization system in the presence of a metallocene catalyst containing a compound having a cyclopentadienyl group and a transition metal selected from the group consisting of titanium, zirconium, hafnium and vanadium to copolymerize ethylene with the α-olefin.

16. The additive (b) for a communication cable filler as claimed in claim 12, wherein the ethylene/α-olefin copolymer (a) satisfies the following formula (3), $$B = P_{OE}/(2 \times P_O \cdot P_E) \tag{3}$$

wherein $P_E$ is a molar fraction of the ethylene component in the copolymer, $P_O$ is a molar fraction of the α-olefin component, and $P_{OE}$ is a molar fraction of α-olefin-ethylene sequences in the all dyad sequences, with the proviso that the molar fraction of each component is a value calculated except the terminal component, and the B value is calculated based on a chart of $^{13}$C-NMR (270 MHz) and satisfies the following formula (4), $$1.0 < B < 2 \tag{4}$$

17. The additive (b) for a communication cable filler as claimed in claim 13, wherein the ethylene/α-olefin copolymer (a) is an ethylene/α-olefin random copolymer obtained from ethylene and an α-olefin of 3 to 10 carbon atoms and having an ethylene component content of 90 to 99 mol % and an α-olefin component content of 10 to 1 mol %.

18. The additive (b) for a communication cable filler as claimed in claim 13, wherein the ethylene/α-olefin copolymer (a) is obtained by feeding ethylene, an α-olefin and hydrogen to the polymerization system in the presence of a metallocene catalyst containing a compound having a cyclopentadienyl group and a transition metal selected from the group consisting of titanium, zirconium, hafnium and vanadium to copolymerize ethylene with the α-olefin.

19. The additive (b) for a communication cable filler as claimed in claim 13, wherein the ethylene/α-olefin copolymer (a) satisfies the following formula (3), $$B = P_{OE}/(2 \times P_O \cdot P_E) \tag{3}$$

wherein $P_E$ is a molar fraction of the ethylene component in the copolymer, $P_O$ is a molar fraction of the α-olefin component, and $P_{OE}$ is a molar fraction of α-olefin-ethylene sequences in the all dyad sequences, with the proviso that the molar fraction of each component is a value calculated except the terminal component, and the B value is calculated based on a chart of $^{13}$C-NMR (270 MHz) and satisfies the following formula (4), $$1.0 < B < 2 \tag{4}$$

* * * * *